United States Patent [19]

Ohkanda et al.

[11] Patent Number: 5,031,395
[45] Date of Patent: Jul. 16, 1991

[54] RECIPROCATING BLADE TYPE TRIMMER

[75] Inventors: Masao Ohkanda, Sagamihara; Takeshi Tanaka, Tokyo, both of Japan

[73] Assignee: Kioritz Corporation, Tokyo, Japan

[21] Appl. No.: 468,906

[22] Filed: Jan. 23, 1990

[30] Foreign Application Priority Data

Jan. 30, 1989 [JP] Japan ................................ 1-10600[U]

[51] Int. Cl.⁵ ............................................. A01G 3/04
[52] U.S. Cl. ........................................ 56/236; 56/301; 172/41
[58] Field of Search ................. 56/2, 233, 298, 301, 56/303, 309, 311, DIG. 9, 234, 236; 172/41, 42, 53, 93, 101; 30/276, 296.1

[56] References Cited

U.S. PATENT DOCUMENTS

| | | | |
|---|---|---|---|
| 2,553,463 | 5/1951 | McCulloch | 172/41 |
| 2,702,978 | 3/1955 | Fowler | 56/2 |
| 3,217,408 | 11/1965 | Jepson et al. | 56/234 |
| 3,907,040 | 9/1975 | Trusty | 172/15 |
| 4,082,149 | 4/1978 | Grobey | 172/40 |
| 4,452,316 | 6/1984 | Edwards | 172/41 |
| 4,648,464 | 3/1987 | Huxley | 172/36 |
| 4,651,420 | 3/1987 | Lonnecker | 30/296 R |

Primary Examiner—Terry Lee Melius
Attorney, Agent, or Firm—Bauer & Schaffer

[57] ABSTRACT

A contra reciprocating blade type trimmer having blades formed on the side and tip of a reciprocally driven cutting bar. The tip blade of each bar reciprocates with respect to each other to cooperate in cutting roots, limbs and the like. the tip blade is provided at the foremost tip of each bar.

1 Claim, 2 Drawing Sheets

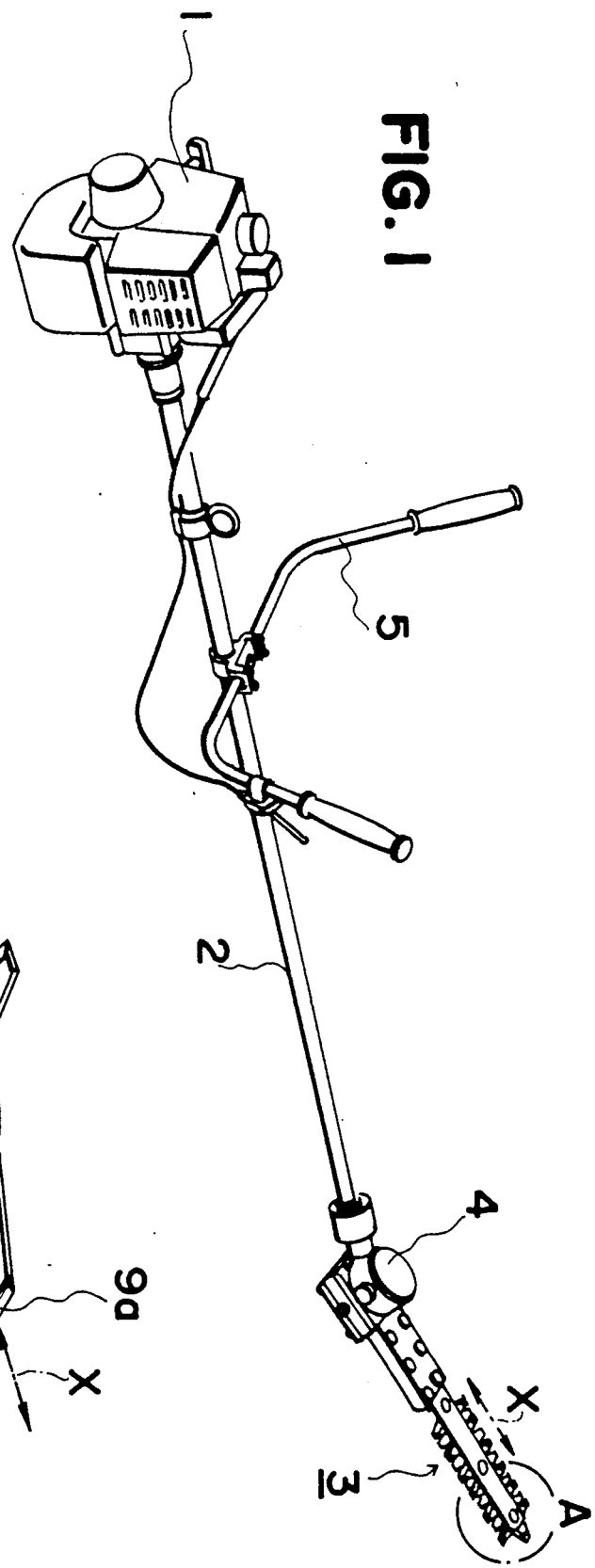
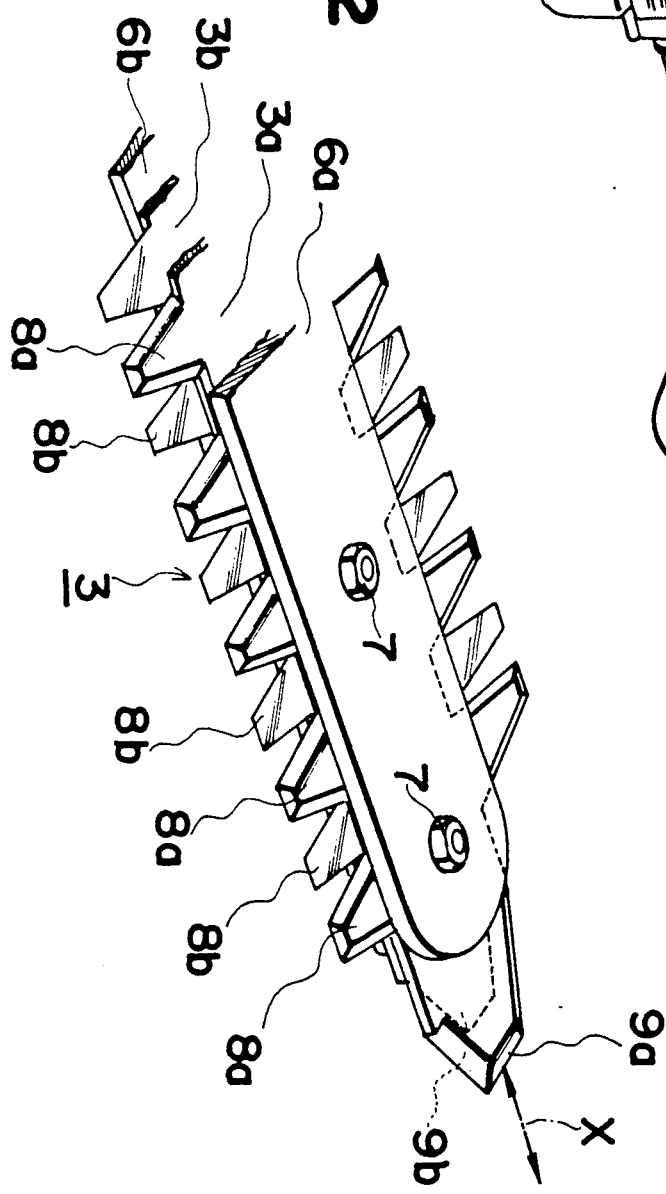

RECIPROCATING BLADE TYPE TRIMMER

FIELD OF THE INVENTION

This invention relates to a reciprocating blade grass and hedge trimmer provided with a reciprocally driven cutting bars having side blades formed on the longitudinal edges in the reciprocating direction.

BACKGROUND OF THE INVENTION

Various reciprocating blade grass and hedge trimmers provided with a reciprocally driven cutting bar having side blades formed on the edges in the reciprocating direction are already provided (for example, in the publication of Japanese Patent Publication No. 42693/1978).

In such conventional trimmers, the mowing or cutting bar has blades formed only on the longitudinal edges in the reciprocating direction. As a result, there is no difficulty when trimming the tops of lawns and hedges. On the other hand, there is difficulty in trimming the boundary between the bunker and lawn of a golf course. Here such known devices are not able to remove the roots of the grass which have entered the sand in the bunker and thus the application of such devices is limited.

Therefore, in order to cut such roots of the grass as have entered the sand bunker, scoops and dredges have to be used and the work is very diffucult.

SUMMARY OF THE INVENTION

An object of the present invention is to provide a reciprocating blade grass and hedge trimmer capable of not only trimming the tops of lawns and hedges, but also of the grass, growing for example, in the boundary between the bunker and lawn of a golf course and at the same time, remove the roots of the grass buried within the sand in the bunker.

According to the present invention, a reciprocating blade trimmer which is provided with a reciprocally driven cutting bar having side blades formed on the longitudinal edge of the bar in the reciprocating direction. Each bar is further provided with a blade formed at the tip and extending forwardly in the longitudinal axis parallel to the above mentioned reciprocating direction.

According to the present invention, now only can the tops of lawns and hedges be trimmed but also, as a further blade, is formed at the tip in the reciprocating direction of the cutting blade. The roots and grass burned in the sand can be removed when the tip is thrust vertically into the sand.

The reciprocating blade type trimmer according to the present invention can be used for trimming not only between the bunker and lawn part of a golf course, but also between a paddy field and ridge.

BRIEF DESCRIPTION OF THE DRAWINGS

In the drawings:

FIG. 1 is a perspective view of a grass and hedge trimmer embodying the present invention;

FIG. 2 is an enlarged view of the tip of the trimmer shown in the circle A of FIG. 1.

DETAILED DESCRIPTION OF THE INVENTION

Figure 3:
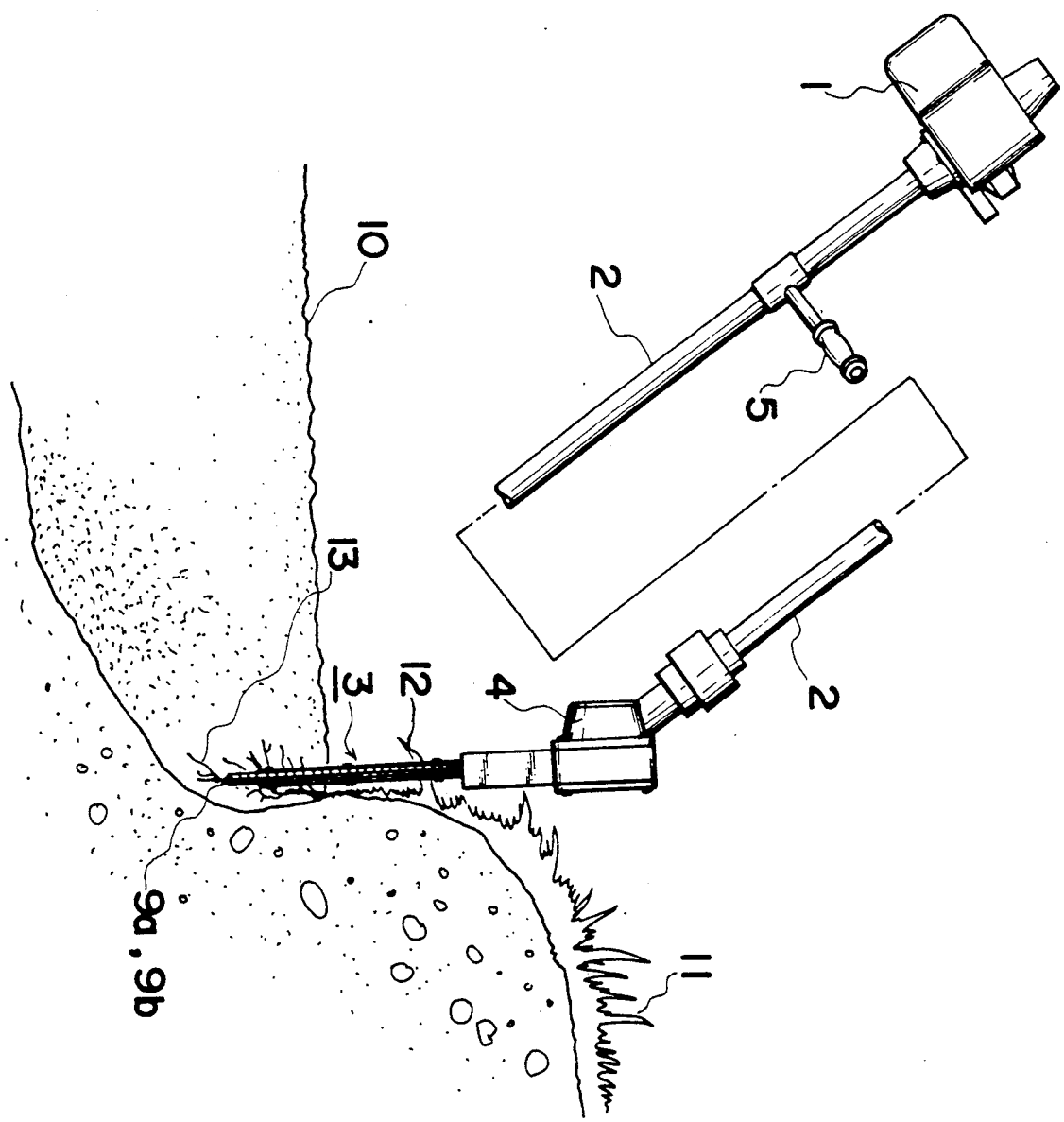
FIG. 3 is a view showing the use of the trimmer.

An embodiment of the present invention will be explained in detail in the following with reference to the drawings.

In FIG. 1, a prime mover, generally depicted by reference numeral 1, such as an air-cooled two-cycle internal combustion engine is mounted at the end of an operating rod 2 through which is inserted the driving shaft (not illustrated) extending from the engine 1. Mounted at the opposite end of the rod 2 is a driven cutting blade apparatus 3 including a driving case 4 provided with a mechanism for converting the power transmitted by the above mentioned driving shaft to reciprocating motion for operating the above mentioned cutting blade apparatus 3. The driving case 4 is fitted to the front end of the above mentioned operating rod 2 so as to be adjustable around the operating rod 2. The reference numeral 5 represents an operating handle.

The driving case 4 can be fitted to the operating rod 2, as is later described, so as to be in the upward position shown in FIG. 1f or to be in the downward position shown in FIG. 3. Further, the fitting direction can be simply changed by means of bolts or the like.

A shown in FIGS. 1 and 2, the cutting blade apparatus 3 is formed of an upper bar 3a and lower bar 3b which reciprocate as seen by the double arrow, along the longitudinal axis in directions reverse to each other. The upper bar 3a and lower bar 3b are held between guiding and holding plates 6a and 6b and are regulated and guided by set bolts 7 or the like so as to be slidable on each other.

Each of the bars 3a are 3b formed, along their longitudinal edges, with a plurality of blades 8a and 8b respectively formed to project outwardly beyond the above mentioned guiding and holding plates 6a and 6b so as to effectively cut parallel to the reciprocating direction X. As known, the blades may be provided on only one of the edges of the bars 3a and 3b.

According to the present invention, the cutting bars 3a and 3b are also formed with blades 9a and 9b respectively extending forwardly from the tips of each bar in the recipocating direction X. In the illustrated embodiment, the tip blades 9a and 9b are provided respectively on both of the above mentioned upper blade 3a and lower blade 3b although only one of them may be formed only on one of the bars. By the way, the above mentioned tip blades 9a and 9b also project respectively out beyond the above mentioned guiding and holding plates 6a and 6b and have cutting edges in all the exposed directions.

As the above mentioned cutting blade apparatus 3 is intended to be exposed to severe conditions, as being thrust vertically into sands as described later, it is desirable to coat the respective blades 8a, 8b, 9a 9b with ceramic or the like to cope with wear and improve durability.

In use, the reciprocating blade type trimmer of the present invention functions the same as the conventional reciprocating blade type trimmer. The tops of lawns and hedges can be trimmed with the side blades 8a and 8b formed on the longitudinal edges of the cutting bar 3a snd 3b. In such case, it is convenient to position the driving case 4 in the position as is shown in FIG. 1.

When the cutting blade driving case 4 is positioned in the direction shown in FIG. 3, the cutting blade apparatus 3 depends vertically and may be thrust tip end first into the sand of the bunker 10, in the boundary between the bunker 10 and lawn 11. The reciprocating motion of the side blades 8a and 8b is thus able to trim the grass 12 projecting into the bunker 10 by the side blades 8a and 8b and at the same time, and the roots 13 of the grass buried in the sand of the bunker 10 are capable of being cut by the tip blades 9a and 9b formed at the tip.

Since the cutting blade apparatus 3 itself is also constructed to be variable in its angle with the driving case 4, the range of use is further expanded.

As explained in detail in the above, not only can the tops of lawns or the like be trimmed, but also the grass in the boundary between the bunker and lawn as for example, on a golf course can be cut. At the same time, the roots of those grasses having entered the sand of the bunker can be removed. The present device produces an improved working efficiency.

What is claimed is:

1. In a grass and hedge trimmer provided with a pair of elongated cutter bars mounted for contrareciprocating movement along a longitudinal axis, wherein each of said cutter bars has a plurality of blades extending outwardly from the longitudinal edges thereof, the improvement wherein an additional tip blade is provided at the foremost tip of each of said bars coaxial with and facing in front of said longitudinal axis and respectively reciprocating with respect to each other to cooperate in cutting roots, limbs, and the like.

* * * * *